United States Patent [19]
Wilkins

[11] Patent Number: 5,367,985
[45] Date of Patent: Nov. 29, 1994

[54] AQUARIUM AIR-MANIFOLD MODULE

[76] Inventor: Bruce F. Wilkins, 100(#2-1) Hemlock, Branford, Conn. 06405

[21] Appl. No.: 20,996

[22] Filed: Feb. 22, 1993

[51] Int. Cl.$^5$ ............................................. A01K 63/00
[52] U.S. Cl. .................................................. 119/263
[58] Field of Search ................... 119/3, 4, 5; 210/169, 210/295, 220

[56] References Cited

U.S. PATENT DOCUMENTS

| | | | |
|---|---|---|---|
| 2,636,473 | 4/1953 | Schwartz et al. | 119/5 |
| 2,871,820 | 2/1959 | Hayden | 119/5 |
| 3,149,608 | 9/1964 | Murphy | 119/5 |
| 3,247,826 | 4/1966 | Girard | 119/5 |
| 3,971,338 | 7/1976 | Alexson | 119/5 |
| 4,023,528 | 5/1977 | Applegate | 119/5 |
| 4,098,230 | 7/1978 | Jackson | 119/5 |
| 4,728,420 | 3/1988 | Abercia, Jr. | 119/5 X |
| 5,054,424 | 10/1991 | Sy | 119/5 |
| 5,160,431 | 11/1992 | Marioni | 119/5 |

FOREIGN PATENT DOCUMENTS 2242340  10/1991  United Kingdom .................. 119/5

*Primary Examiner*—Thomas Price
*Attorney, Agent, or Firm*—Inventech Co.

[57] ABSTRACT

An aquarium air-manifold having modular-construction provision, serving to beautify the typical aquarium by virtually eliminating the usual entanglement of multiple air/feed-lines visibly extending down the inside wall of the aquarium. Preferably molded of transparent-plastic to a squared-tubular cross-section, the manifold can be formed into a grid like format, and several modules may be plugged together to cover as large an area on the floor of the aquarium as may be desired. The air-manifold preferably draws upon only a single air/input-line, while serving a plurality of provisional outlets. Each outlet may either adapted with a plug or an outlet-fitting, thereby enabling the aquarium designer to create any convenient arrangement of outlets as may be desired for the particular aquadic-environment.

7 Claims, 1 Drawing Sheet

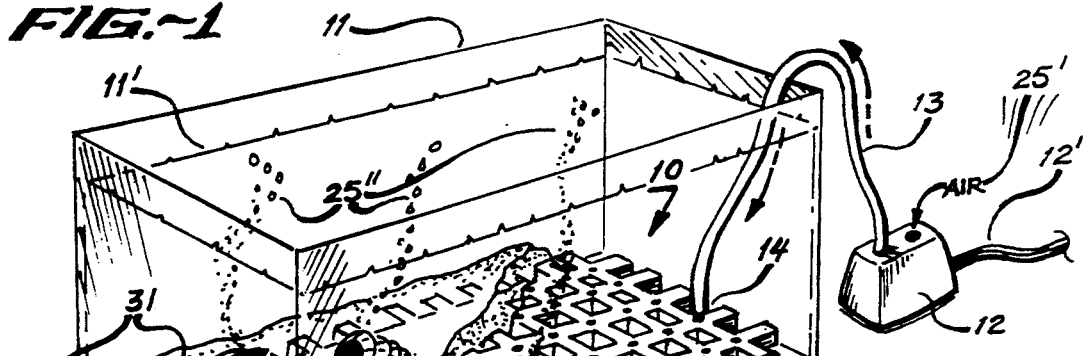

AQUARIUM AIR-MANIFOLD MODULE

SUMMARY OF THE INVENTION

A.) In view of the foregoing discussion about the earlier invention art, it is therefore important to make it clear to others interested in the art that the object of this invention is to provide an otherwise conventional aquarium with a special grid like air manifold, comprised of multiple intersecting tubular passageways which communicate in common with a single feed-line.

B.) Another object of this invention is to provide the above described aquarium air-manifold, wherein a plurality of convenience outlets are provided, preferably situated at each intersecting junction of the tubular passageways, thereby enabling the user to arrange the shortest possible local secondary tubing into commercially available accessories where the air is allowed to burble upwardly away. In cases where air is desired to exit directly up through the sand via a screw-in air-filter, the outlets will need no secondary tubing. Note here, that while a press-in/tapered-seat type of fitting attachment or securing means is contemplated, screw-threads are much preferred, particularly owing to the ease by which a suitable valve-action is readily achieved (virtually eliminating costly valve-body assembly).

C.) Another object of this invention is to provide the above described aquarium air-manifold configuration, wherein the described outlets are made with a built-in air-valve provision preferably comprising a screw-threaded upper portion which turns down upon an integrally molded teat-like needle portion; the combination serving to enable the user to readily access and regulate localized air-flow, simply by rotating the one-piece upper valve portion in or out until a desired degree of air-flow is realized at that localized outlet.

D.) Another object of this invention is to provide the above described aquarium air-manifold apparatus, wherein the described grid-like manifolding is preferably made of injection-molded hi-impact transparent-plastic, which can be readily molded in two mirror-image halfs, which are chemically bonded together to form a preferably rigid air-manifold of high structural integrity. The only difference between the two mating halfs, resides in the upper half having a bore to subsequently receive fittings, while the lower half may include a vestigial cone-like needle-tip, positioned to precisely align with the above bore provision. p E.) Another object of this invention is to provide the above described aquarium air-manifold apparatus, wherein the described grid-like manifolding is preferably formed square in cross-section so as to create a relatively stable upper-surface. The end-runners of each tubular air-passage preferably extending only half the distance of those runners prevailing within the grid work itself, thereby facilitating a very convenient modular manner of construction; whereby two or more such manifold units may be readily united to build still larger manifolding over the bottom of any size aquarium. Joining the merging end-runners of each respective manifold, are male-(preferably)couplers made of resilient vinyl-plastic, which simply plug-in in place of the end-runner's resilient vinyl-plastic end-plugs normally occluding the end-runners, so air escapes only out a fitting at manifold intersections.

DESCRIPTION OF THE PREFERRED EMBODIMENT DRAWINGS

The foregoing and still other objects of this invention will become fully apparent, study of the ensuing description of these embodiments. Wherein indicia of reference are shown to match related points given in the text, as well as the claims section annexed hereto; and accordingly, a better understanding of the invention and the variant uses is intended, by reference to the drawings, which are considered as primarily exemplary and not to be therefore construed as restrictive in nature.

FIG. 1, is a pictorial perspective-view favoring the top, left-side, and front-side of a conventional aquarium assembly, the invention contained therein is partially phantom-outlined, as it is normally concealed beneath the here partially cut-away aquarium-sand;

FIG. 2, is a plan-view of the manifold only, showing how additional modules may be preferably joined to form progressively larger manifolding for virtually any aquarium;

FIG. 3, is a greatly enlarged cross-sectional detail taken along reference-plane 3:3 in FIG. 2, revealing an exemplified valving arrangement; plus, component interchangability;

FIG. 4, a plan-view, showing a minimal non-modular generic-variant embodiment;

FIGS. 5/A,B,C is a cross-sectional view taken along reference-plane 5:5 of FIG. 2, exemplifying three generic-variant embodiments.

ITEMIZED NOMENCLATURE REFERENCES 10,10',10"—variant exemplified air-manifold module
11,11'—the walled aquarium housing, ref. water-level
12,12'—an exemplified external air-pump, with electrical-cord
13—pressurized-air feed tubing
14—selected air-inlet port
15—intersection air-valve
16—intersection air-plug
17,17'—tubular internal-passageway, flow-arrow
18,18',18"—passageway end-runners
19,19',19"—end-runner male-plug (cap), plug removed, locator-flange
20,20'—end-runner male-coupler, locator-bead
21/21',21"—manifold upper/lower halfs, bonded joiner-seam
22,22'—rotary-valve nipple, finger-wing entities
23,23',23"—valve-seat, integral valve-needle, elevated valve-needle
24,24',24"—typical 4-way intersection, typical 3-way intersection, boss region
25,25',25"—outlet tubing, outlet captive air-flow, free bubble-stream
26,26',26"—decor-chest, chest underside surface
27,27',27"—general random valving terminal locations
28—end expansion-module
29—side expansion-module
30—rotary screw-valve axial port
31—aquarium-sand
32/32'—upper-half section, square/rounded
33/33'—lower-half section, square/rounded
34,34'—mating male/screw-threaded shank, female/screw-threaded bore
35—decor-shell aerator
36—aerator-filter unit

DETAILED DESCRIPTION OF THE PREFERRED EMBODIMENTS

Initial reference is given by way of FIG. 1, wherein is exemplified an outlined aquarium-frame assembly 11 containing water at upper reference-level 11', including a special exemplified grid like air-manifold module 10 along with an exemplified external air-pump 12 having electrical power-cord 12', and an optimised single pressurized-air feed tubing 13 routed down into the aquarium 10 confines to some selected air-inlet terminal such as port station 14 for example. Note that for a more realistic representation, aquarium sand 31 has been included here at left, normally substantially covering and concealing the convenience air-manifold, the sand being shown in partial cutaway manner toward the left. This clearly reveals how the exemplified air-manifold module 10 serves to enable an aquarium owner to arrange their various aquadic-decor items such as a treasure-chest 26, or seashell 35, directly over a selected typical air-outlet valve terminal 27 (others typically exemplified at terminals 27' and 27") thereby ultimately producing the vital and familiar aquarium aerating air-bubble stream 25" out of the special rotatable air-valve's nipple 22 or via tubing attached decor-item or air/disbursal-filter 36. The detail of FIG. 5A shows how the filter 36 may be screwed directly into the manifold, so that a very low-profile arrangement may be realized.

Note in FIGS. 2 & 3 how the typical air-manifold 10' end-runners 18, 18' and 18" etc., may be uncapped and joined together with suitably configured expansion-modules 28(end) and 29(side) via friction fitting modular ported injection-molded resilient transparent-vinyl male-couplers 20 (these "inter-couplers" may also be of external-fitting female con-figuration). This arrangement thus eliminating use of the friction-fitted resilient molded-vinyl runner-caps 21, which normally serve to occlude uncontrolled escape of manifold air. Note also how in FIG. 1, the runner-caps are ideally employed at end-runners all around the air-manifold 10 perimeter, while in FIG. 2 only at two different sides; yet, in FIG. 4 end-runners are not employed at all, since this module 10" exemplifies a more economical version preferably serving a given popular sized aquarium only. The cross-section view of FIG. 3 reveals how the rotary-valve nipple 22 may be employed to insert directly upward into the here underside 26' of an exemplified decor-chest 26 (resting upon sandy surface 31), whereby air escapes 25" as depicted in FIG. 1.

Accordingly, an important aspect in the function of this rigid grate-like air-manifold device resides in the uniquely convenient way in which the provisional air-valves may be selectively situated at preferred intersections, and moveover, in the preferred incorporation of a novel rotary-valve like action best illustrated in FIGS. 3 & 5/A,B,C, wherein cross-section FIG. 5A shows a sharply elevated stationary valve-needle 23" entity, while cross-section FIG. 5B shows a valve-needle entity 23' substantially like that revealed in FIG. 3; although here, the station bore outlet is closed-off via air-plug 16. Reference to FIG. 5C discloses a planar formed closure surface area 23, which perhaps technically may functionally be regarded as tantamount to a needle-valve seat-surface; although for purposes of general reference herein, any one of these examples simply acts as a closure-surface relative to the decending rotary-port valve portion 30 clearly depicted in FIG. 3. The threaded-bore 34' of FIG. 5C is here shown empty, prior to receiving a fitting of choice. Functionally, the more pronounced valve-needle like shape 23" extending vertically from the internal wall surface of manifold body's lower-half portion 33 of example FIG. 5A is an inherently more precisely controllable configuration, since it's elevated or elongated formation tends to penetrate the rotary-valve like port 30' (here formed as part of an optional twist-regulatable/aeration-filter accessory 36) more gradually owing to it's wall-inclination; particularly in contrast to the example of FIG. 5C which ultimately tends to seal-off air flow more abruptly. This discussion, about valve-seat or needle configuration, and juxtapositioning of same, is essentially academic however;—in as much as it more concerns performance and design choice variants of what is regarded as the generic overall invention function and operation and is again already supported in the nomenclature list.

Thus, it is readily understood how the preferred and generic-variant embodiments of this air-manifold invention serve to perform convenient functions not heretofore realized. It is to be understood that the utility of the foregoing adaptations of this invention are not necessarily dependent upon any prevailing invention patent; and while the present invention has been well described hereinbefore by way of preferred embodiments, it is to be realized that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation. Accordingly, the embodiments of the invention in which an exclusive property or proprietary privilege is claimed, are defined as follows.

What is claimed of proprietary inventive origin is:

1. For a conventional aquarium employing a pressurized source of air heretofore involving an ungainly multitude of air feed inlet lines, an air distribution device serving to negate the multiple clutter of such lines, while facilitating greater convenience in routing air to select regions within the aquarium; said air distribution device comprising:

a single air feed inlet line supplying fresh air from said source of air external of said aquarium to a selected device fitting, said device fitting thereby becoming the inlet fitting;

a horizontally arranged body having at least one air-passageway in discrete fluid communication with said external inlet line;

a plurality of air outlet receptacle means arranged at an upwardly facing side of said air-passageway body;

a special fitting means adaptable to each said receptacle plurality, whereby said receptacle would serve as a provisional air outlet, or otherwise be provisionally plugged;

at least one horizontal air runner arranged continuously with said air-passageway, which may be frictionally plugged into via male/female manner as a modular air-passageway extension thereto, or otherwise whereby a runner plug is applied there to terminate said body air-passageway in an airtight manner.

2. A horizontally arranged air-distribution body according to claim 1, wherein each said air outlet receptacle means is a female threaded vertical bore capable of receiving either a male threaded plug or a male threaded screw-valve body.

3. A horizontally arranged air-distribution body according to claim 2, wherein said screw-valve body includes a coaxial port, and is provided with a downwardly arranged terminus formed as to effect a needle valve like arrangement with a upwardly facing coaxial projection fixed with a lower wall of said air-passageway; whereby manual rotation of said screw-valve body enables the air flow to be adjusted to flow coaxially up through said screw-valve body at any particularly desired rate.

4. A horizontally arranged air-distribution body according to claim 2, wherein said screw-valve body is provided with an upwardly projecting coaxial nipple like portion, facilitating application of an additional tube thereto in support of an air outlet accessory.

5. A horizontally arranged air-distribution body according to claim 1, wherein said air-passageway extension arrangement includes a plug-on inter-coupler member, whereby additional air-distribution bodies may be arranged to cover the horizontal surface area of the aquarium as may be required.

6. A horizontally arranged air-distribution body according to claim 1, wherein said air-passageway is configured as a plurality of horizontally spaced interconnectedly intersecting air-passageways sharing fluid communication with a common said air inleting.

7. A horizontally arranged air-distribution body according to claim 6, wherein each air-passageway intersection includes a vertically arranged air outlet receptacle means.

* * * * *